(12) United States Patent
Nagai et al.

(10) Patent No.: US 8,884,257 B2
(45) Date of Patent: Nov. 11, 2014

(54) CHAMBER APPARATUS AND EXTREME ULTRAVIOLET LIGHT GENERATION SYSTEM

(75) Inventors: Shinji Nagai, Hiratsuka (JP); Junichi Fujimoto, Oyama (JP); Kouji Ashikawa, Hiratsuka (JP)

(73) Assignee: Gigaphoton Inc., Tochigi (JP)

( * ) Notice: Subject to any disclaimer, the term of this patent is extended or adjusted under 35 U.S.C. 154(b) by 34 days.

(21) Appl. No.: 13/562,950

(22) Filed: Jul. 31, 2012

(65) Prior Publication Data

US 2013/0126761 A1    May 23, 2013

(30) Foreign Application Priority Data

Nov. 17, 2011 (JP) ................. 2011-251786

(51) Int. Cl.
*G02B 5/08* (2006.01)
*G21K 5/00* (2006.01)
*H05G 2/00* (2006.01)

(52) U.S. Cl.
CPC ............... *H05G 2/008* (2013.01); *H05G 2/005* (2013.01); *G21K 5/00* (2013.01); *G02B 5/0891* (2013.01)
USPC ...................................... 250/504 R

(58) Field of Classification Search
CPC ......... G21K 5/00; G02B 5/081; H05G 2/005; H05G 2/008
USPC ...................................... 250/504 R
See application file for complete search history.

(56) References Cited

U.S. PATENT DOCUMENTS

| | | | |
|---|---|---|---|
| 7,671,349 B2 | 3/2010 | Bykanov et al. | |
| 2010/0258748 A1* | 10/2010 | Vaschenko et al. | 250/504 R |
| 2011/0226745 A1* | 9/2011 | Nagai et al. | 219/121.62 |
| 2011/0266468 A1* | 11/2011 | Nagai et al. | 250/504 R |
| 2011/0309260 A1* | 12/2011 | Nishisaka et al. | 250/372 |

* cited by examiner

*Primary Examiner* — Jack Berman
*Assistant Examiner* — James Choi
(74) *Attorney, Agent, or Firm* — McDermott Will & Emery LLP

(57) ABSTRACT

A chamber apparatus, which may be used with an external apparatus having an obscuration region, may include: a chamber in which EUV light is generated; a collector mirror having a first through-hole formed in a region aside from the center thereof and configured to collect the EUV light generated inside the chamber, the collector mirror being positioned such that the first through-hole is located in a region substantially corresponding to the obscuration region; and an etching gas supply unit provided in the first through-hole and configured to supply an etching gas into the chamber.

9 Claims, 17 Drawing Sheets

CHAMBER APPARATUS AND EXTREME ULTRAVIOLET LIGHT GENERATION SYSTEM

CROSS-REFERENCE TO RELATED APPLICATION

The present application claims priority from Japanese Patent Application No. 2011-251786 filed Nov. 17, 2011.

BACKGROUND

1. Technical Field

This disclosure relates to a chamber apparatus, and an extreme ultraviolet (EUV) light generation system.

2. Related Art

In recent years, semiconductor production processes have become capable of producing semiconductor devices with increasingly fine feature sizes, as photolithography has been making rapid progress toward finer fabrication. In the next generation of semiconductor production processes, microfabrication with feature sizes at 60 nm to 45 nm, and further, microfabrication with feature sizes of 32 nm or less will be required. In order to meet the demand for microfabrication with feature sizes of 32 nm or less, for example, an exposure apparatus in which a system for generating EUV light at a wavelength of approximately 13 nm combined with a reduced projection reflective optical system is needed.

Three kinds of systems for generating EUV light are known in general, which include a Laser Produced Plasma (LPP) type system in which plasma is generated by irradiating a target material with a laser beam, a Discharge Produced Plasma (DPP) type system in which plasma is generated by electric discharge, and a Synchrotron Radiation (SR) type system in which orbital radiation is used to generate plasma.

SUMMARY

A chamber apparatus according to one aspect of this disclosure, which may be used with an external apparatus having an obscuration region, may include: a chamber in which EUV light is generated; a collector mirror having a first through-hole formed in a region aside from the center thereof and configured to collect the EUV light generated inside the chamber, the collector mirror being positioned such that the first through-hole is located in a region substantially corresponding to the obscuration region; and an etching gas supply unit provided in the first through-hole and configured to supply an etching gas into the chamber.

An extreme ultraviolet light generation system according to another aspect of this disclosure may include: the above-described chamber apparatus; a laser apparatus configured to output a laser beam; and an optical system configured to guide the laser beam from the laser apparatus to the chamber apparatus.

BRIEF DESCRIPTION OF THE DRAWINGS

Hereinafter, selected embodiments of this disclosure will be described with reference to the accompanying drawings.

DETAILED DESCRIPTION

Figure 1:
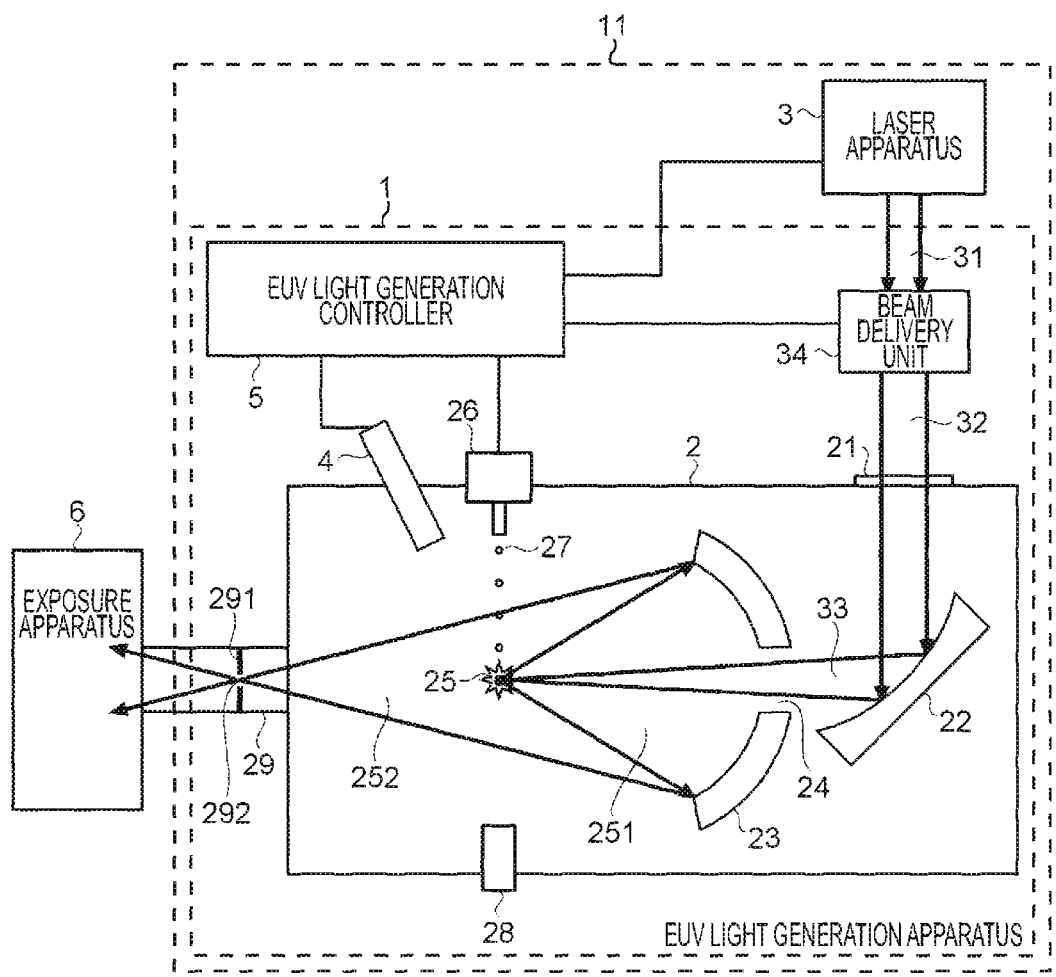
FIG. 1 schematically illustrates the configuration of an exemplary EUV light generation system.

Hereinafter, selected embodiments of this disclosure will be described in detail with reference to the accompanying drawings. The embodiments to be described below are merely illustrative in nature and do not limit the scope of this disclosure. Further, the configuration(s) and operation(s) described in each embodiment are not all essential in implementing this disclosure. Note that like elements are referenced by like reference numerals and characters, and duplicate descriptions thereof will be omitted herein. The embodiments of this disclosure will be illustrated following the table of contents below.

Contents

1. Overview
2. Terms
3. Overview of EUV Light Generation System
 3.1 Configuration
 3.2 Operation
4. EUV Light Generation Apparatus Including H Radical Supplier
 4.1 Configuration
 4.2 Operation
 4.3 Effect
5. EUV Light Generation Chamber Apparatus Including H Radical Supplier
 5.1 Modifications of EUV Collector Mirror
 5.1.1 First Modification
 5.1.2 Second Modification
 5.1.3 Third Modification
6. EUV Light Generation Chamber Apparatus Including Magnetic Field Generator
 6.1 Modifications of EUV Collector Mirror
 6.1.1 First Modification
 6.1.2 Second Modification
7. H Radical Supplier
 7.1 H Radical Supplier with Tungsten Filament: First Example
 7.2 H Radical Supplier with Tungsten Filament: Second Example
 7.3 H Radical Supplier with Tungsten Cylinder
 7.4 H Radical Supplier by Microwave
8. Variations of Head Unit
 8.1 First Example
 8.2 Second Example
 8.3 Third Example
 8.4 Effects
9. Installation of H Radical Supplier

1. Overview

Embodiments to be described hereinafter mainly pertain to mitigation of debris in an extreme ultraviolet light generation apparatus.

2. Terms

Terms used in this specification may be interpreted as follows. The term "obscuration region" may refer to a three-dimensional region, inside a chamber apparatus and/or an exposure apparatus, where EUV light reflected by an EUV collector mirror need not be used for exposure. Accordingly, a constituent element may be placed in the obscuration region or the reflective surface of the EUV collector mirror corresponding to the obscuration region may be altered without affecting the exposure processing in the exposure apparatus.

3. Overview of EUV Light Generation System

3.1 Configuration

FIG. 1 schematically illustrates the configuration of an exemplary LPP type EUV light generation system. An LPP type EUV light generation apparatus 1 may be used with at least one laser apparatus 3. Hereinafter, a system that includes the EUV light generation apparatus 1 and the laser apparatus 3 may be referred to as an EUV light generation system 11. As illustrated in FIG. 1 and described in detail below, the EUV light generation system 11 may include a chamber apparatus 2, a target supply unit, and so forth. The target supply unit may be a droplet generator 26. The chamber apparatus 2 may be airtightly sealed. The target supply unit may be mounted onto the chamber apparatus 2 to, for example, penetrate a wall of the chamber apparatus 2. A target material to be supplied by the target supply unit may include, but is not limited to, tin, terbium, gadolinium, lithium, xenon, or any combination thereof.

The chamber apparatus 2 may have at least one through-hole or opening formed in its wall, and a pulse laser beam 32 may travel through the through-hole/opening into the chamber apparatus 2. Alternatively, the chamber apparatus 2 may be provided with a window 21, through which the pulse laser beam 32 may travel into the chamber apparatus 2. An EUV collector mirror 23 having a spheroidal surface may be provided, for example, inside the chamber apparatus 2. The EUV collector mirror 23 may have a multi-layered reflective film formed on the spheroidal surface thereof. The reflective film may include a molybdenum layer and a silicon layer, which are laminated alternately. The EUV collector mirror 23 may have a first focus and a second focus, and may be positioned such that the first focus lies in a plasma generation region 25 and the second focus lies in an intermediate focus (IF) region 292 defined by the specification of an external apparatus, such as an exposure apparatus 6. The EUV collector mirror 23 may have a through-hole 24 formed at the center thereof, and a pulse laser beam 33 may travel through the through-hole 24 toward the plasma generation region 25.

The EUV light generation system 11 may further include an EUV light generation controller 5 and a target sensor 4. The target sensor 4 may have an imaging function and detect at least one of the presence, the trajectory, and the position of a droplet 27.

Further, the EUV light generation system 11 may include a connection part 29 for allowing the interior of the chamber apparatus 2 and the interior of the exposure apparatus 6 to be in communication with each other. A wall 291 having an aperture may be provided inside the connection part 29, and the wall 291 may be positioned such that the second focus of the EUV collector mirror 23 lies in the aperture formed in the wall 291.

The EUV light generation system 11 may also include a beam delivery unit 34, a laser beam focusing mirror 22, and a target collector 28 for collecting targets in the form of droplets 27. The beam delivery unit 34 may include an optical element for defining the direction into which the pulse laser beam 32 travels and include an actuator for adjusting the position and the orientation (posture) of the optical element.

3.2 Operation

With continued reference to FIG. 1, a pulse laser beam 31 outputted from the laser apparatus 3 may pass through the beam delivery unit 34 and be outputted therefrom as a pulse laser beam 32 after having its direction optionally adjusted. The pulse laser beam 32 may travel through the window 21 and enter the chamber apparatus 2. The pulse laser beam 32 may travel inside the chamber apparatus 2 along at least one beam path from the laser apparatus 3, be reflected by the laser beam focusing mirror 22, and strike at least one droplet 27 as a pulse laser beam 33.

The target supply unit may be configured to output the droplet(s) 27 toward the plasma generation region 25 inside the chamber apparatus 2. The droplet 27 may be irradiated with at least one pulse of the pulse laser beam 33. Upon being irradiated with the pulse laser beam 33, the droplet 27 may be turned into plasma, and rays of light 251 including EUV light may be emitted from the plasma. At least EUV light 252 included in the light 251 may be reflected selectively by the EUV collector mirror 23. The EUV light 252 reflected by the EUV collector mirror 23 may travel through the intermediate focus region 292 and be outputted to the exposure apparatus 6. Here, the droplet 27 may be irradiated with multiple pulses included in the pulse laser beam 33.

The EUV light generation controller 5 may be configured to integrally control the EUV light generation system 11. The EUV light generation controller 5 may be configured to process image data of the droplet 27 captured by the target sensor 4. Further, the EUV light generation controller 5 may be configured to control at least one of the timing at which the droplet 27 is outputted and the direction into which the droplet 27 is outputted. Furthermore, the EUV light generation controller 5 may be configured to control at least one of the timing at which the laser apparatus 3 oscillates, the direction in which the pulse laser beam 31 travels, and the position at which the pulse laser beam 33 is focused. It will be understood that the various controls mentioned above are merely examples, and other controls may be added as necessary.

4. EUV Light Generation Apparatus Including H Radical Supplier

4.1 Configuration

Figure 2:
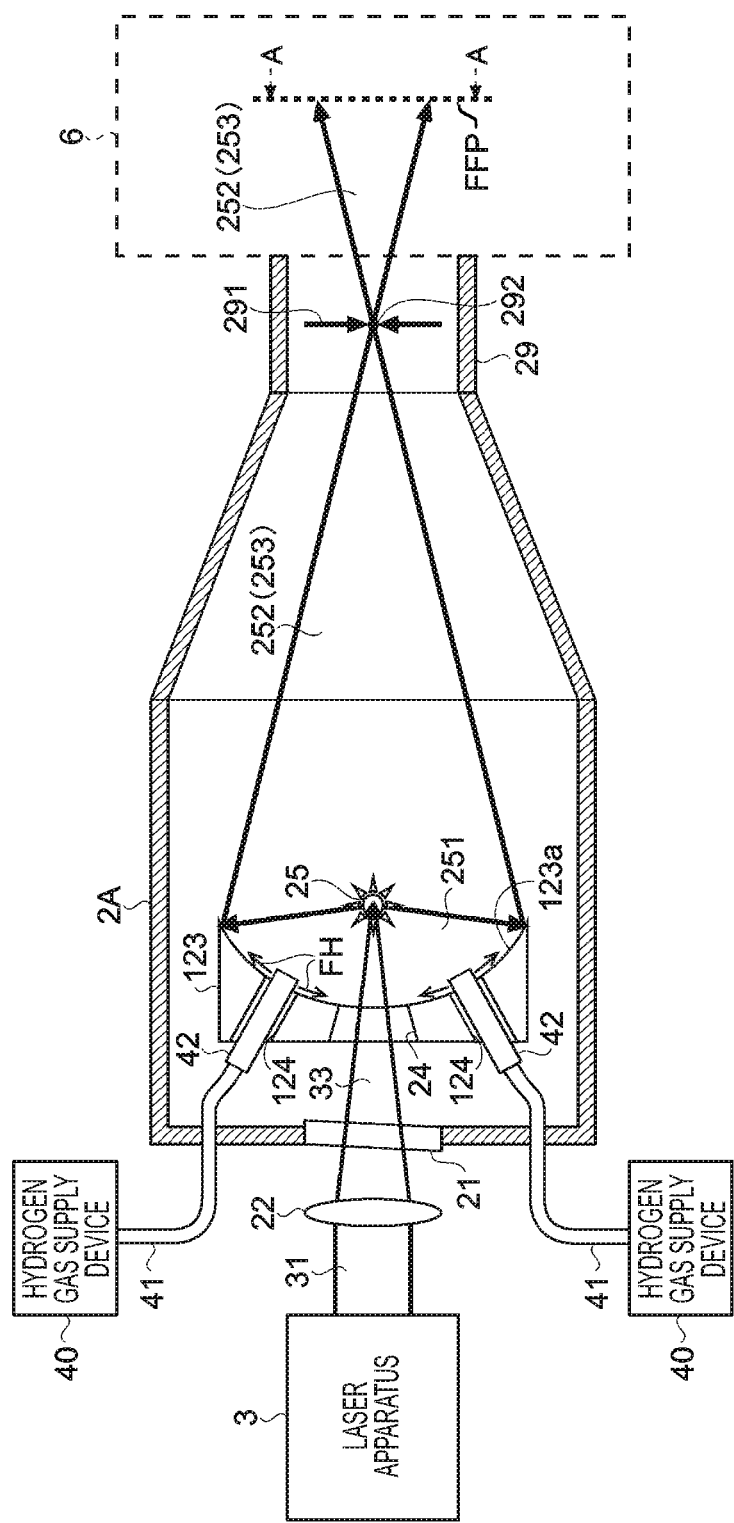
FIG. 2 is a sectional view schematically illustrating an example of the configuration of an EUV light generation apparatus according to a first embodiment of the present disclosure, taken along a plane containing an axis of reflected EUV light.
Figure 3:
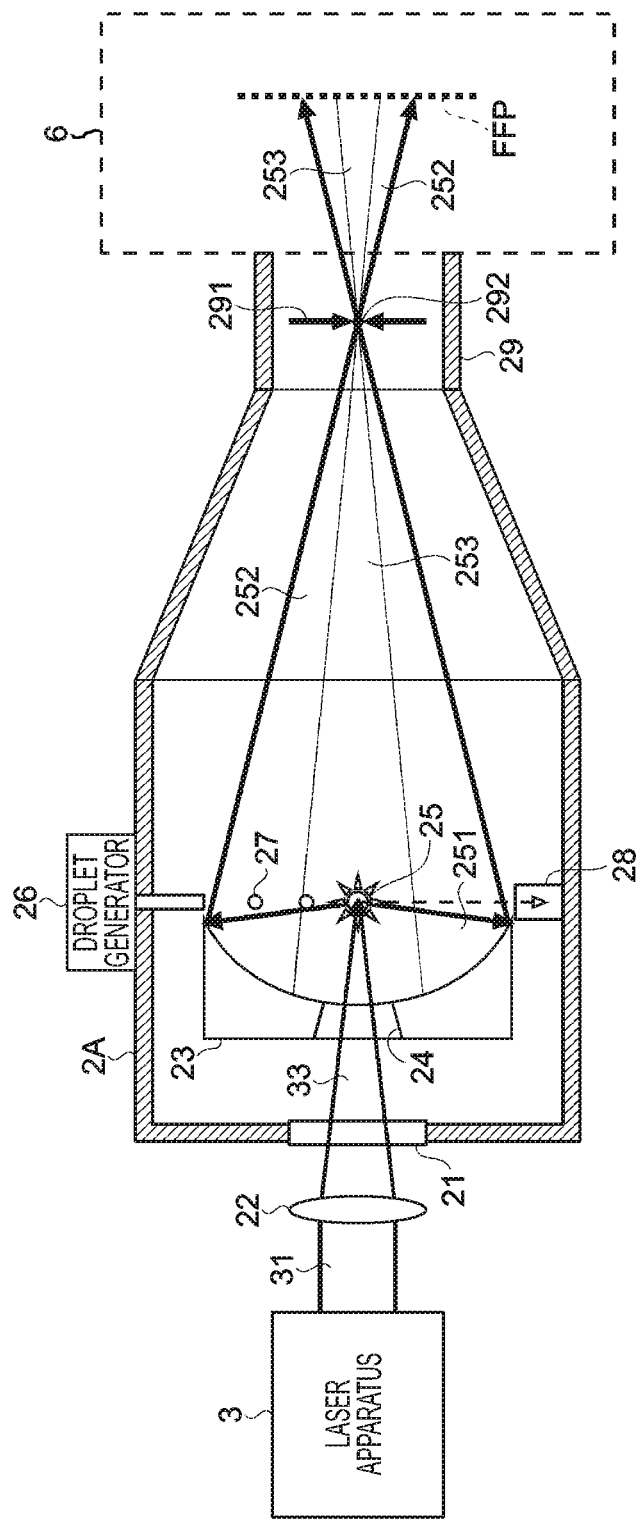
FIG. 3 is another sectional view of the EUV light generation apparatus shown in FIG. 2, taken along a different plane containing the axis of the reflected EUV light.
Figure 4:
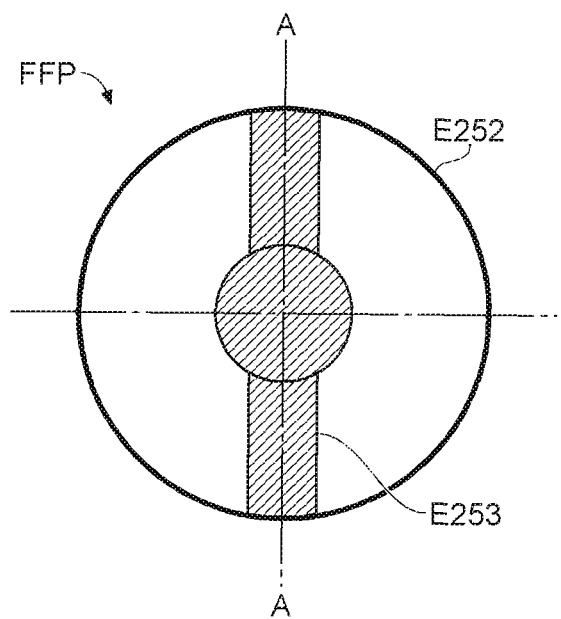
FIG. 4 shows an example of a far field pattern of EUV light projected inside an exposure apparatus.

FIG. 2 is a sectional view schematically illustrating an example of the configuration of an EUV light generation apparatus according to a first embodiment, taken along a plane containing an axis of reflected EUV light. FIG. 3 is another sectional view of the EUV light generation apparatus shown in FIG. 2, taken along a different plane containing the axis of the reflected EUV light. FIG. 4 shows an example of a far field pattern of EUV light projected inside an exposure apparatus.

As shown in FIGS. 2 and 3, a chamber apparatus 2A may include the window 21, an EUV collector mirror 123, and at least one radical supplier 42 serving as an etching gas supply unit. The chamber apparatus 2A may be connected optically with the exposure apparatus 6 through the connection part 29. Further, as shown in FIG. 3, the chamber apparatus 2A may further include the droplet generator 26, and the target collector 28.

An obscuration region 253 may be defined in the chamber apparatus 2A and in the exposure apparatus 6. As shown in FIG. 4, a far field pattern FFP of EUV light 252 projected inside the exposure apparatus 6 along A-A plane (see FIG. 2) may include a projected image E252 of the EUV light 252, and the projected image E252 may include a region E253 which corresponds to the obscuration region 253.

The EUV collector mirror 123 may have the through-hole 24 formed at the center thereof and at least another through-hole 124. Then, the EUV collector mirror 123 may be arranged in the chamber apparatus 2A such that the through-hole 124 is positioned in a region corresponding to the obscuration region 253.

The radical supplier 42 may be provided in the through-hole 124 such that a leading end of the radical supplier 42 projects from a mirror surface 123a of the EUV collector mirror 123 toward the plasma generation region 25 (see FIG. 2). The radical supplier 42 may be connected to a hydrogen gas supply device 40 through a gas pipe 41. The radical supplier 42 may further be connected to a power supply (not shown).

4.2 Operation

The hydrogen gas supply device 40 may be configured to supply a hydrogen gas into the radical supplier 42 through the gas pipe 41. The power supply may be configured to supply, for example, an electric power to the radical supplier 42 under the control of the EUV light generation controller 5. The radical supplier 42 may convert the hydrogen gas supplied through the gas pipe 41 into hydrogen radicals FH using the supplied electric power. Then, the generated hydrogen radicals FH may be discharged toward the mirror surface 123a from the leading end of the radical supplier 42.

4.3 Effect

The hydrogen radicals FH discharged toward the mirror surface 123a from the radial supplier 42 may react with Sn debris deposited on the mirror surface 123a while flowing along the mirror surface 123a. Here, the reaction product of the hydrogen radicals FH and the Sn debris may be $SnH_4$ ($4H^* + Sn \rightarrow SnH_4$). Through this reaction, the Sn debris deposited on the mirror surface 123a may be removed in the form of gas. As a result, reduction in reflectance of the EUV collector mirror 123 may be suppressed.

In the above-described configuration, the radical supplier 42 may be provided in the through-hole 124. This configuration allows the radical supper 42 to be positioned close to the mirror surface 123a. Hydrogen radicals are generally short-lived. In the first embodiment, since the radical supplier 42 is placed close to the mirror surface 123a on which the Sn debris may be deposited, the hydrogen radicals FH may effectively reach the mirror surface 123a to reach with the Sn debris thereon.

Gas discharged from the radical supplier 42 is not limited to the hydrogen radicals FH, and may be any gas capable of etching debris deposited on the mirror surface 123a.

5. EUV Light Generation Chamber Apparatus Including H Radical Supplier

Figure 5:
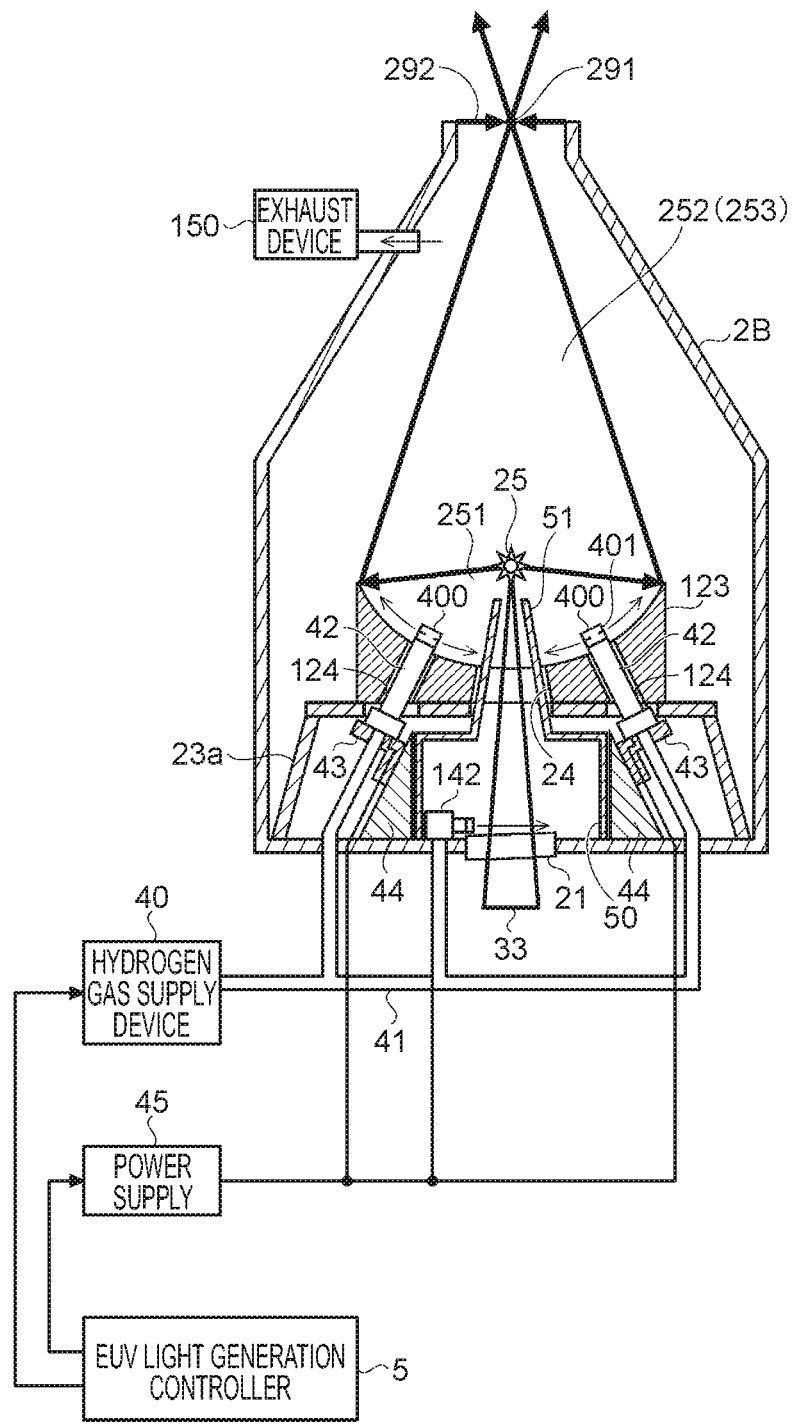
FIG. 5 schematically illustrates an example of the configuration of a chamber apparatus according to a second embodiment of the present disclosure.

FIG. 5 schematically illustrates an example of the configuration of a chamber apparatus according to a second embodiment. As shown in FIG. 5, a chamber apparatus 2B may include the window 21, the EUV collector mirror 123, a mirror mount 23a, and a covering 50. The chamber apparatus 2B may further include radical suppliers 42 and 142, a slide stage 43, a support tilt stage 44, the gas pipe 41, the hydrogen gas supply device 40, a power supply 45, and an exhaust device 150.

Figure 6:
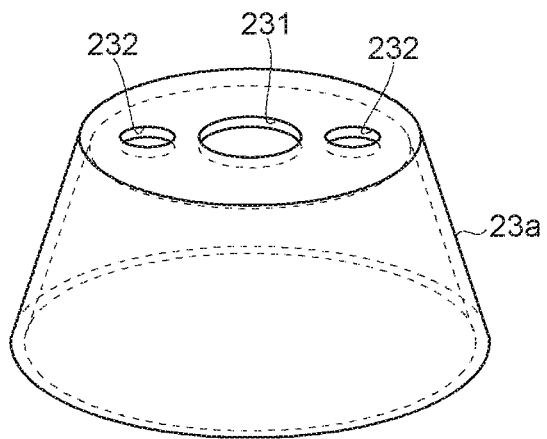
FIG. 6 shows an example of a mirror mount shown in FIG. 5.

FIG. 6 shows an example of the mirror mount shown in FIG. 5. As shown in FIG. 6, the mirror mount 23a may be hollow and truncated conical in shape. The mirror mount 23a may be fixed inside the chamber apparatus 2B, and the EUV collector mirror 123 may be fixed on the mirror mount 23a. Through-holes 231 and 232 may be formed in the mirror mount 23a, and the EUV collector mirror 123 may be fixed on the mirror mount 23a such that the through-hole 231 is in communication with the through-hole 24 and the through-holes 232 are in communication with the through-holes 124. The mirror mount 23a may be fixed in the chamber apparatus 2B such that the through-holes 24 and 124 in the EUV collector mirror 123 fixed on the mirror mount 23a are located in a region corresponding to the obscuration region 253.

The radical supplier 42 may include a head unit 400, serving as a discharge unit, provided at a leading end of the radical supplier 42. The radical supplier 42 may be configured to convert a hydrogen gas supplied from the hydrogen gas supply device 40 through the gas pipe 41 into the hydrogen radicals FH using an electric power supplied from the power supply 45. The generated hydrogen radicals FH may be discharged toward the mirror surface 123a of the EUV collector mirror 123 through the head unit 400. The radical supplier 42 may be provided in the through-hole 232 and the through-hole 124 such that the head unit 400 projects from the mirror surface 123a toward the plasma generation region 25. A trailing end of the radical supplier 42 may be held by the slide stage 43 inside the mirror mount 23a. The slide stage 43 may be held by the support tilt stage 44, serving as a support unit, which is fixed to the chamber apparatus 2B inside the mirror mount 23a.

Figure 7:
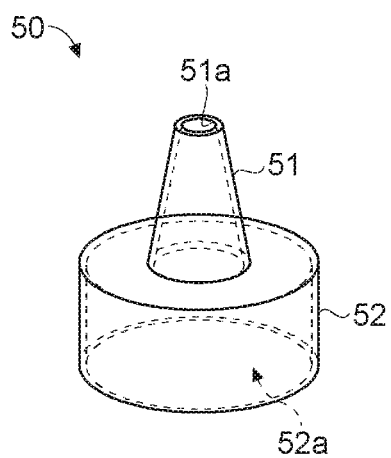
FIG. 7 shows an example of a covering shown in FIG. 5.

FIG. 7 shows an example of a covering 50. The covering 50 may include a hollow cylindrical part 52 and a hollow conical part 51. The conical part 51 may be connected to the cylindrical part 52 at the base side thereof. The interior of the cylindrical part 52 may be in communication with the interior of the conical part 51. An opening 52a may be formed at a flat end of the cylindrical part 52 opposite to the flat end at which the conical part 51 is connected to the cylindrical part 52. An opening 51a may be formed in the conical part 51 at the vertex side thereof.

The covering 50 may be provided inside the chamber apparatus 2B such that the opening 52a formed in the cylindrical part 52 covers the window 21 (see FIG. 5). Further, the radical supplier 142 may be provided in a space defined by the covering 50 (see FIG. 5). The cylindrical part 52 of the covering 50 may be housed inside the mirror mount 23a. The conical part 51 may project from the mirror surface 123a through the through-hole 231 and the through-hole 24. The opening 51a formed in the conical part 51 may be oriented toward the plasma generation region 25.

Figure 8:
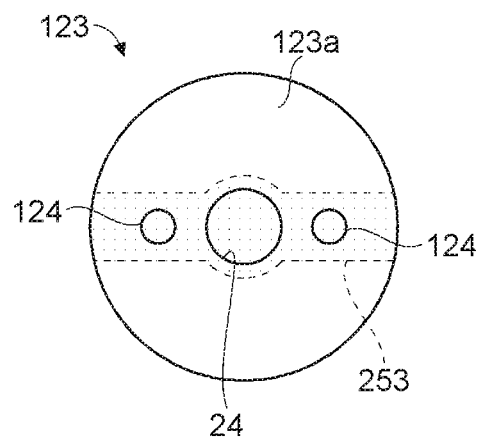
FIG. 8 schematically illustrates an EUV collector mirror shown in FIG. 5, as viewed from a plasma generation region.

FIG. 8 schematically illustrates the EUV collector mirror shown in FIG. 5, as viewed from the plasma generation region. As shown in FIG. 8, the EUV collector mirror 123 may have the through-hole 24 formed at the center thereof and the through-holes 124 each formed at a position offset from the center of the mirror surface 123a. The EUV collector mirror 123 may be held by the mirror mount 23a such that the through-holes 24 and 124 are located in a region corresponding to the obscuration region 253.

Figure 9:
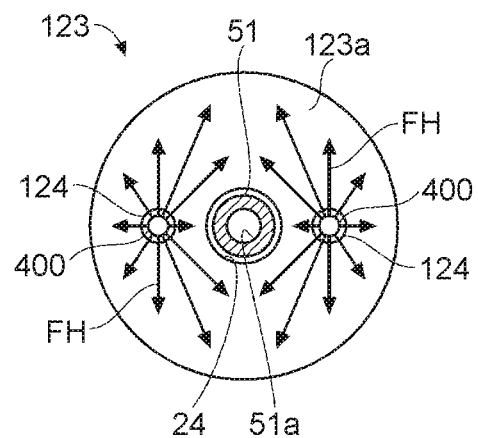
FIG. 9 schematically illustrates the EUV collector mirror, a head unit of a radical supplier, and a conical part of the covering shown in FIG. 5, as viewed from the plasma generation region.

FIG. 9 schematically illustrates the EUV collector mirror 123, the head unit of the radical supplier 142, and the conical part 51 of the covering shown in FIG. 5, as viewed from the plasma generation region 25.

As shown in FIG. 9, the conical part 51 may project from the mirror surface 123a through the through-hole 24. The pulse laser beam 33 that has entered the chamber apparatus 2B through the window 21 (see FIG. 5) may travel through the interior of the cylindrical part 52 and the interior of the conical part 51 and be outputted toward the plasma generation region 25 through the opening 51a formed in the conical part 51. Further, gas, such as the hydrogen radicals FH, supplied into the covering 50 by the radical supplier 142 may be discharged through the opening 51a.

The head units 400 of the radical suppliers 42 may project from the mirror surface 123a through the respective through-holes 124. An outlet 401 may be formed in the head unit 400, and the radical supplier 42 may be positioned in the through-hole 124 so that the outlet 401 faces a direction substantially parallel to a tangent to the mirror surface 123a. Alternatively, the radical supplier 42 may be positioned so that the outlet 401 is oriented toward the mirror surface 123a with respect to a tangent to the mirror surface 123a. With this arrangement, the hydrogen radicals FH may be blown against the mirror surface 123a. With either of the aforementioned configuration, the hydrogen radicals FH discharged from the head unit 400 may flow along the mirror surface 123a. Then, the hydrogen radicals FH may react with the Sn Debris deposited on the mirror surface 123a to form $SnH_4$ gas. As a result, the Sn debris deposited on the mirror surface 123a may be removed.

The resultant $SnH_4$ gas, the unused hydrogen radicals FH, and a hydrogen gas resulted from the deactivated hydrogen radicals FH may be discharged outside the chamber apparatus 2B by the exhaust device 150. Further, $SnH_4$ gas, the hydrogen radicals FH, and the hydrogen gas discharged through the opening 51a from the conical part 51 may also be discharged outside the chamber apparatus 2B by the exhaust device 150.

5.1 Modifications of EUV Collector Mirror

5.1.1 First Modification

Figure 10:
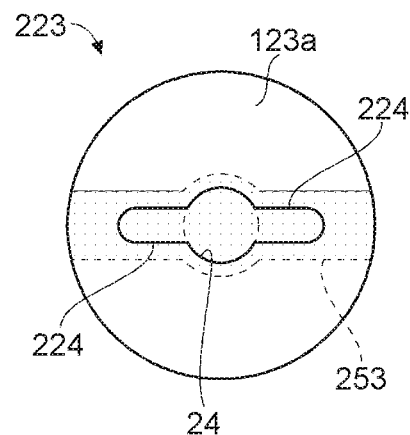
FIG. 10 shows a first modification of the EUV collector mirror of the second embodiment of the present disclosure.

FIG. 10 shows a first modification of the EUV collector mirror of the second embodiment. As shown in FIG. 10, an EUV collector mirror 223 may include two openings 224 extending from the through-hole 24 formed at the center of the EUV collector mirror 223. The openings 224 may extend in the opposite directions from the through-hole 24. The EUV collector mirror 223 configured as such may be positioned so that the through-hole 24 and the openings 224 are located in a region corresponding to the obscuration region 253. The radical suppliers 42 may be provided in the respective openings 224.

5.1.2 Second Modification

Figure 11:
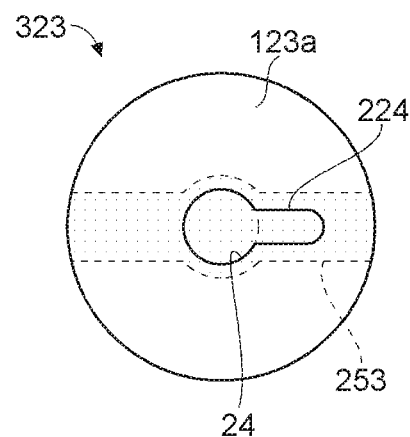
FIG. 11 shows a second modification of the EUV collector mirror of the second embodiment of the present disclosure.

FIG. 11 shows a second modification of the EUV collector mirror of the second embodiment. As shown in FIG. 11, an EUV collector mirror 323 may include a single opening 224 formed to extend from the through-hole 24. With this configuration as well, the EUV collector mirror 323 may be positioned such that the through-hole 24 and the opening 224 are located in a region corresponding to the obscuration region 253. The radical supplier 42 may be provided in the opening 224.

5.1.3 Third Modification

Figure 12:
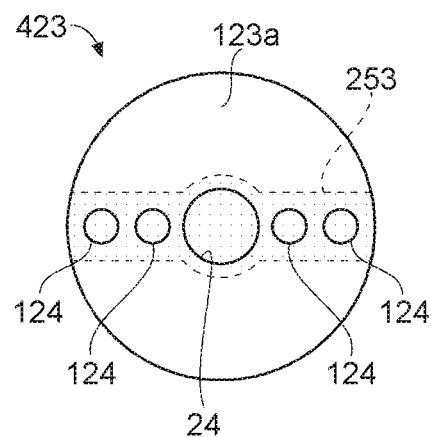
FIG. 12 shows a third modification of the EUV collector mirror of the second embodiment of the present disclosure.

FIG. 12 shows a third modification of the EUV collector mirror of the second embodiment. In this embodiment, multiple through-holes 124 may be formed in an EUV collector mirror 423, and each of the through-holes 124 may be formed at a position offset from the center of the EUV collector mirror 423. With this configuration, the EUV collector mirror 423 may be positioned such that the through-holes 24 and 124 are located in a region corresponding to the obscuration region 253. The radical supplier 42 may be provided in at least one of the multiple through-holes 124.

Figure 13:
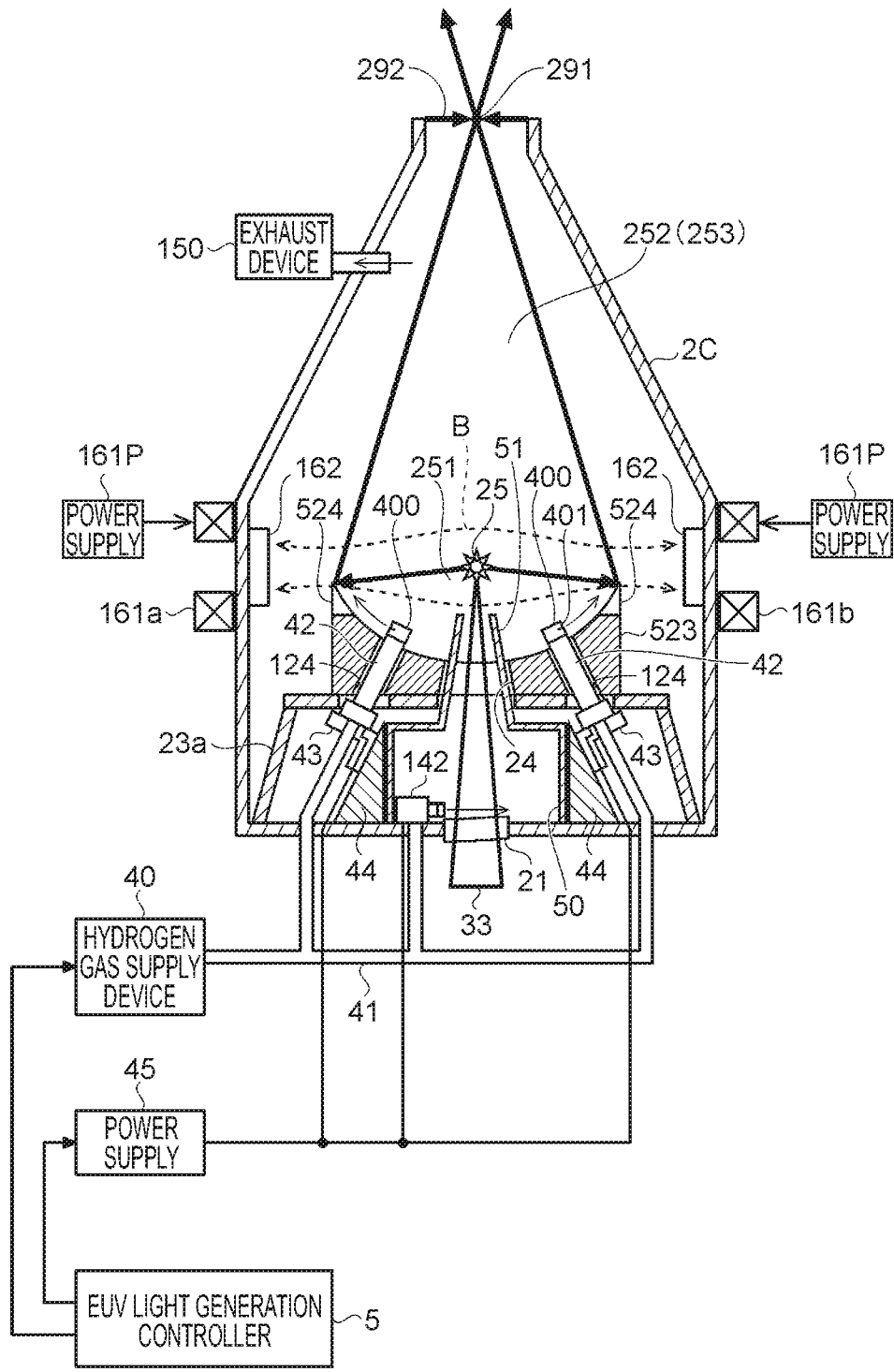
FIG. 13 schematically illustrates an example of the configuration of a chamber apparatus according to a third embodiment of the present disclosure.

6. EUV Light Generation Chamber Apparatus Including Magnetic Field Generator FIG. 13 schematically illustrates an example of the configuration of a chamber apparatus according to a third embodiment. In this example, a chamber apparatus 2C may include a magnetic field generator for generating a magnetic field to trap ionized debris generated when plasma is generated. The chamber apparatus 2C may be similar in configuration to the chamber apparatus 2B shown in FIG. 5, but may differ in that the chamber apparatus 2C may include an EUV collector mirror 523 in place of the EUV collector mirror 123. Further, the chamber apparatus 2C may include a pair of coils 161a and 161b for generating a magnetic field B to trap the ionized debris, and debris collectors 162 to collect the ionized debris trapped in the magnetic field B.

The coils 161a and 161b may be provided outside or inside the chamber apparatus 2C such that a line connecting the respective centers of the coils 161a and 161b passes through the plasma generation region 25. The coils 161a and 161b may each be connected to a power supply 161P. The power supply 161P may supply an electric power to the coils 161a and 161b under the control of the EUV light generation controller 5. With the electric power supplied from the power supply 161P, the magnetic field B may be generated in a space between the coils 161a and 161b to pass through the plasma generation region 25.

The ionized debris trapped in the magnetic field B may move toward either the coil 161a or the coil 161b along the magnetic field B. The debris collector 162 may be placed in a direction into which the ionized debris trapped in the magnetic field B moves. With this arrangement, the ionized debris moving along the magnetic field B may be collected into the debris collectors 162.

The radical suppliers 42 may be provided in the respective through-holes 124 formed in the EUV collector mirror 523, as in the configuration shown in FIG. 5. However, in the third embodiment, the radical supplier 42 may be positioned such that the outlet 401 formed in the head unit 400 is oriented toward the outer periphery of the EUV collector mirror 523, as shown in FIG. 13. This configuration may allow the hydrogen radicals FH to flow more efficiently along a region of the mirror surface 123a (see FIG. 14) where the ionized debris flowing along the magnetic field B is more likely to be deposited.

Figure 14:
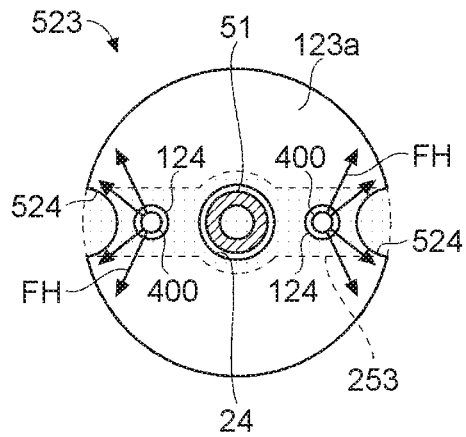
FIG. 14 schematically illustrates an EUV collector mirror shown in FIG. 13, as viewed from a plasma generation region.

FIG. 14 shows an example of the EUV collector mirror shown in FIG. 13. In this example, the EUV collector mirror 523 may be similar in configuration to the EUV collector mirror 123 shown in FIG. 8, but may differ in that notches 524 may be formed in the EUV collector mirror 523. In the example shown in FIG. 14, two notches 524 may be formed, and the EUV collector mirror 523 configured as such may be positioned so that the through-holes 24 and 124 and the notches 524 are located in a region corresponding to the obscuration region 253 and so that the notches 524 are located closer to the respective debris collectors 162. The notches 524 may be provided to prevent the ionized debris moving along the magnetic field B from sputtering the mirror surface 123a of the EUV collector mirror 523.

6.1 Modifications of EUV Collector Mirror

6.1.1 First Modification

Figure 15:
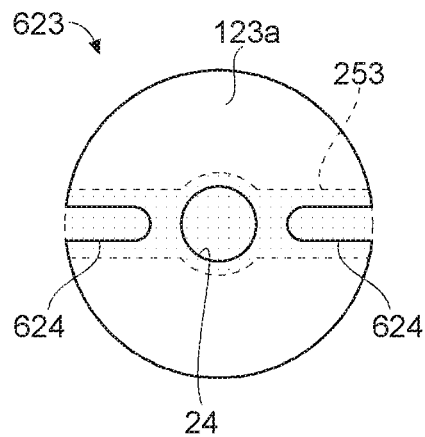
FIG. 15 shows a first modification of the EUV collector mirror of the third embodiment of the present disclosure.

FIG. 15 shows a first modification of the EUV collector mirror of the third embodiment. In this example, an EUV collector mirror 623 may include, in place of the through-holes 124 and the notches 524 in the EUV collector mirror 523, notches 624 extending from the outer periphery toward the center of the EUV collector mirror 623. As such, the EUV collector mirror 623 may be positioned so that the through-hole 24 and the notches 624 are located in a region corresponding to the obscuration region 253 and so that the notches 624 may be positioned closer to the respective debris collectors 162. In the EUV collector mirror 623, the notches 624 may be provided to prevent the ionized debris flowing along the magnetic field B from sputtering the mirror surface 123a. When the ionized debris sputters the mirror surface 123a, the mirror surface 123a may be heated and deformed, and the wavefront of the EUV light 252 (see FIG. 13) reflected by the mirror surface 123a may be deformed. The exposure processing may not be performed properly with the EUV light 252, which has a deformed wavefront. In addition, the radical suppliers 42 may be provided in the respective notches 624.

6.1.2 Second Modification

Figure 16:
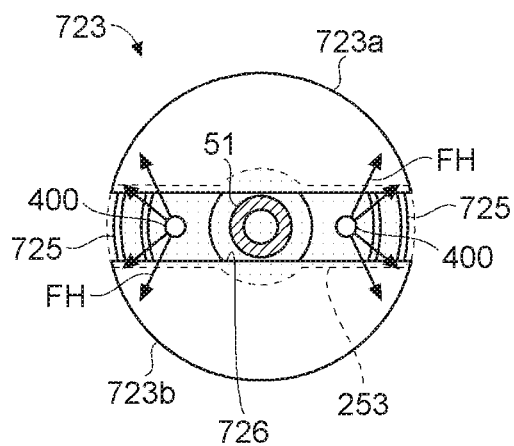
FIG. 16 shows a second modification of the EUV collector mirror of the third embodiment of the present disclosure.

FIG. 16 shows a second modification of the EUV collector mirror of the third embodiment. In this embodiment, the EUV collector mirror 723 may include two semiarc concave mirrors 723a and 723b held by an annular mirror coupling plate 725 with a space 726 provided between the semiarc concave mirror 723a and 723b. The space 726 between the semiarc concave mirrors 723a and 723b may serve to function similarly to the through-holes 24 and 124 and the notches 524 of the EUV collector mirror 523 shown in FIG. 14. That is, the conical part 51 of covering 50 and the radical suppliers 42 may be provided in the space 726. Further, providing the space 726 may prevent the ionized debris flowing along the magnetic field B from sputtering the mirror surface 123a. As such, the EUV collector mirror 723 may be positioned so that the space 726 is located in a region corresponding to the obscuration region 253.

7. H Radical Supplier

Hereinafter, specific examples of the radical supplier of the above-described embodiments will be described with reference to the drawings.

7.1 H Radical Supplier with Tungsten Filament

First Example

Figure 17:
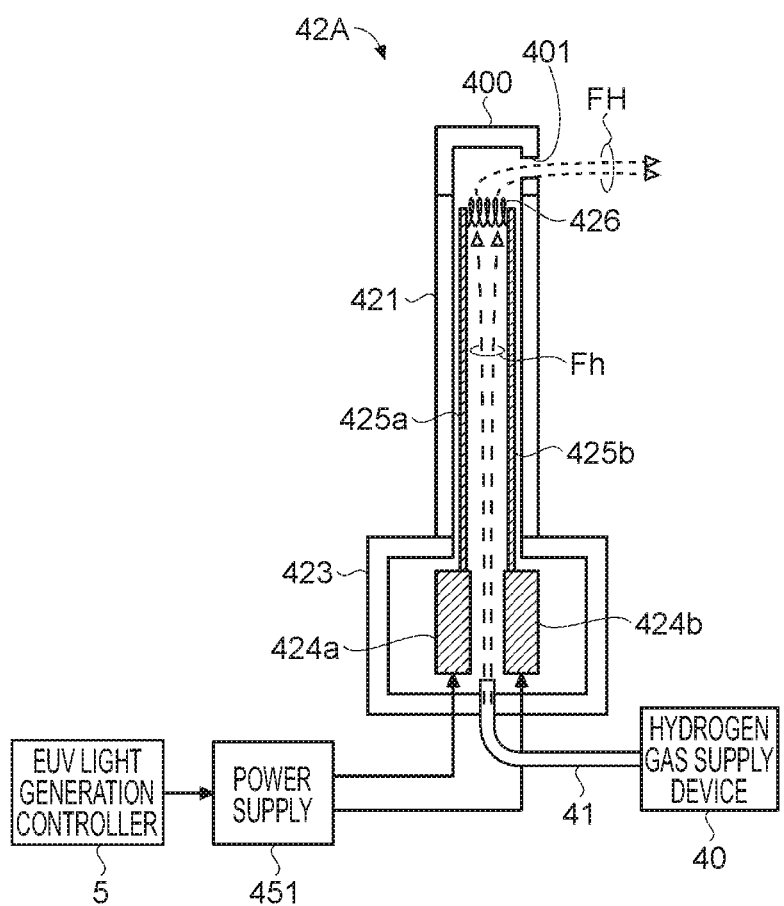
FIG. 17 shows an example of a radical supplier including a tungsten filament.

FIG. 17 shows an example of a radical supplier including a tungsten filament. In this example, a radical supplier 42A may include a box 423, a cylinder 421, and a head unit 400. The interior of the box 423 may be in communication with the hydrogen gas supply device 40 through the gas pipe 41. Electrodes 424a and 424b connected to a power supply 451 may be provided inside the box 423. The power supply 451 may supply an electric power to the electrodes 424a and 424b under the control of the EUV light generation controller 5.

The cylinder 421 may be provided to project from the box 423. The head unit 400 may be provided at a leading end of the cylinder 421. The interior of the head unit 400 may be in communication with the interior of the box 423 through the interior of the cylinder 421. With this configuration, a hydrogen gas Fh supplied into the box 423 from the hydrogen gas supply device 40 through the gas pipe 41 may flow into the head unit 400 through the cylinder 421. An excitation source, such as a tungsten filament 426 serving as a generation unit, may be provided in the cylinder 421 at the leading end side thereof.

The tungsten filament 426 may be connected to the electrodes 424a and 424b through respective wires 425a and 425b running inside the cylinder 421. The tungsten filament 426 may, for example, be heated to a temperature equal to or higher than 1800° C. with an electric power supplied from the power supply 451. When the tungsten filament 426 is heated to a temperature equal to or higher than 1800° C., the hydrogen gas Fh passing around the tungsten filament 426 may be excited to result in the hydrogen radicals FH. The resultant hydrogen radicals FH may flow into the head unit 400 and be discharged through the outlet 401.

7.2 H Radical Supplier with Tungsten Filament

Second Example

Figure 18:
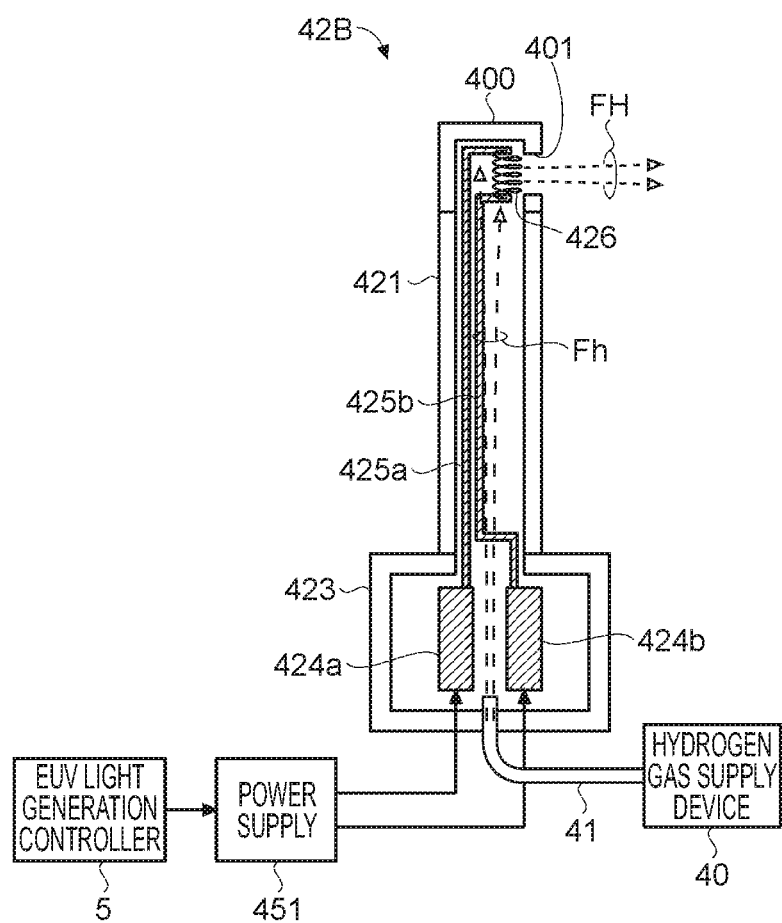
FIG. 18 shows another example of a radical supplier including a tungsten filament.

FIG. 18 shows another example of a radical supplier including a tungsten filament. In this example, a radical supplier 42B may be similar in configuration to the radical supplier 42A shown in FIG. 17, but may differ in that the tungsten filament 426 may be provided inside the head unit 400 in the radical supplier 42B. Since the tungsten filament 426 is provided closer to the outlet 401, a ratio of the hydrogen radicals FH to the hydrogen gas Fh discharged through the outlet 401 may be increased.

7.3 H Radical Supplier with Tungsten Cylinder

Figure 19:
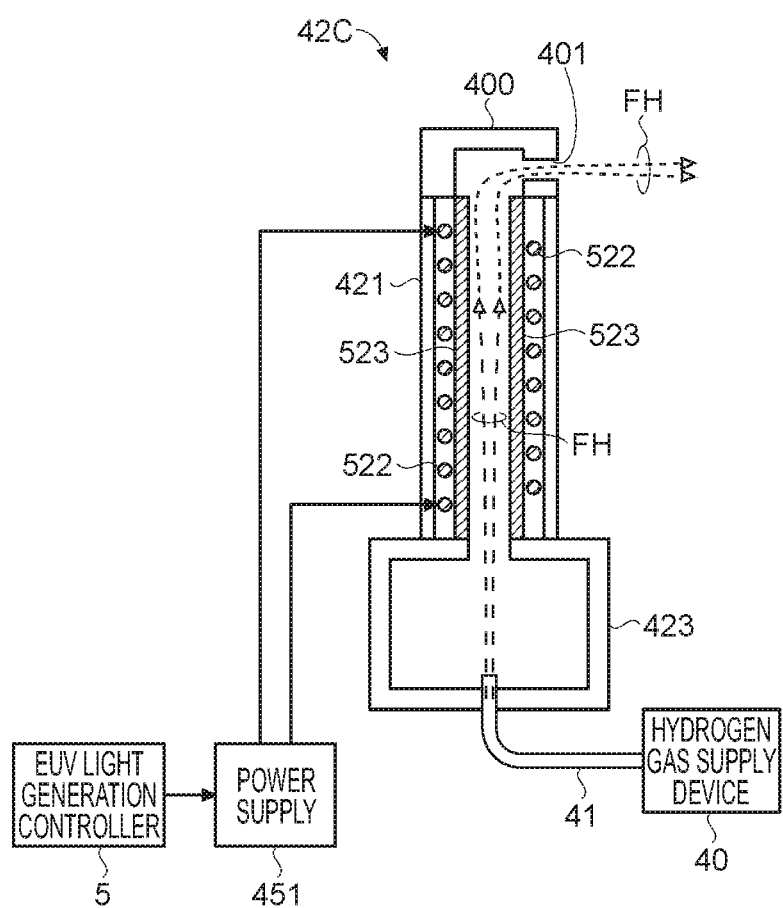
FIG. 19 shows an example of a radical supplier including a tungsten cylinder.

FIG. 19 shows an example of a radical supplier including a tungsten cylinder. In this example, a radical supplier 42C may include a heater 522 and a tungsten cylinder 523 in place of the tungsten filament 426 of the radical supplier 42A or 42B (see FIGS. 17 and 18).

The tungsten cylinder 523 may be provided inside the cylinder 421 to form a cylindrical space therebetween. The heater 522 may be wound around the tungsten cylinder 523 in the aforementioned cylindrical space.

The heater 522 may be connected to the power supply 451. With an electric power supplied from the power supply 451 to the heater 522, the tungsten cylinder 523 may be heated to a temperature equal to or higher than 1800° C. With this configuration, the hydrogen gas Fh that flows into the cylinder 421 from the box 423 may be excited as it passes around the tungsten cylinder 523. As a result, the hydrogen radicals FH may be discharged through the outlet 401 formed in the head unit 400. Here, the heater 522 may be a tungsten heater.

7.4 H Radical Supplier by Microwave

Figure 20:
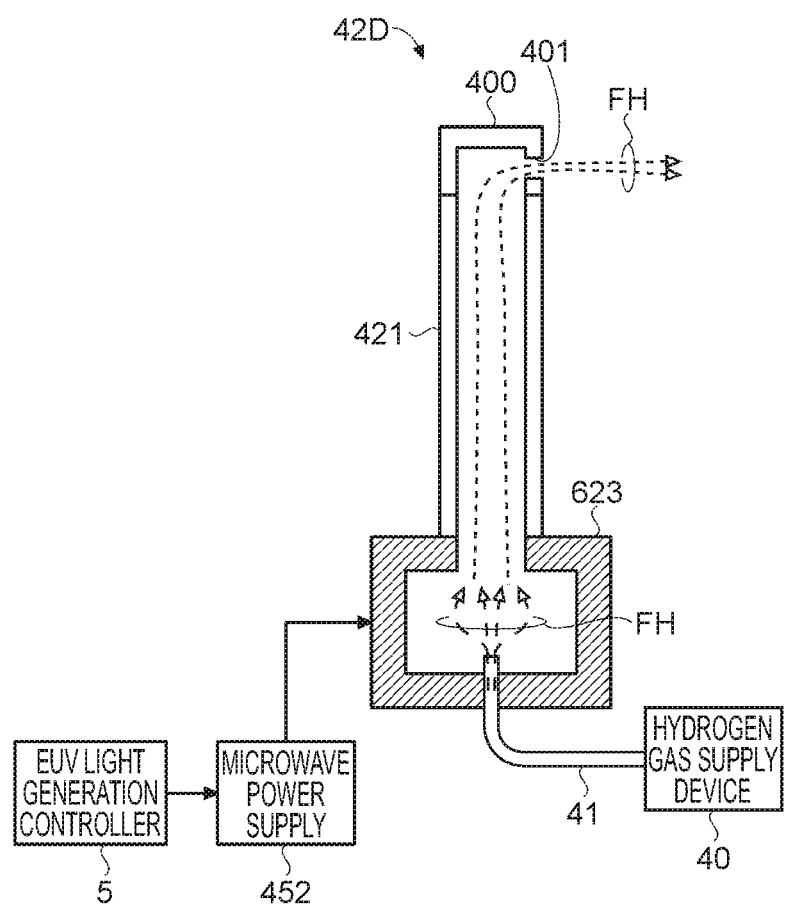
FIG. 20 shows an example of a radical supplier using a microwave.

FIG. 20 shows an example of a radical supplier using a microwave. In this example, a radical supplier 42D may include a hollow microwave generator 623 in place of the box 423 of the radical supplier 42A, 42B, or 42C (see FIGS. 17 through 19). Further, the tungsten filament 426 may be omitted in the radical supplier 42D.

The interior of the microwave generator 623 may be in communication with the hydrogen gas supply device 40 through the gas pipe 41. Further, the interior of the microwave generator 623 may be in communication with the interior of the cylinder 421.

The microwave generator 623 may be connected to a microwave power supply 452, and the microwave power supply 452 may supply an electric power to the microwave generator 623. With the electric power supplied from the microwave power supply 452 to the microwave generator 623, the hydrogen gas Fh that flows into the microwave generator 623 may be excited by the microwave to result in the hydrogen radicals FH. The resultant hydrogen radicals FH may be discharged through the outlet 401 formed in the head unit 400 through the cylinder 421.

8. Variations of Head Unit

Hereinafter, specific examples of the head unit in the above-described embodiments will be described with reference to the drawings.

8.1 First Example

Figure 21:
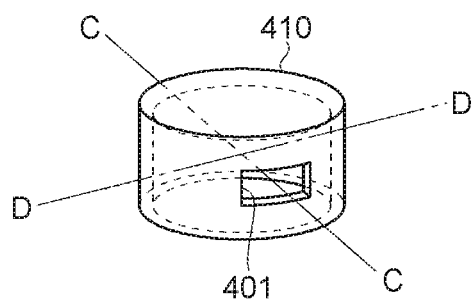
FIG. 21 schematically illustrates a first example of the configuration of a head unit.
Figure 22:
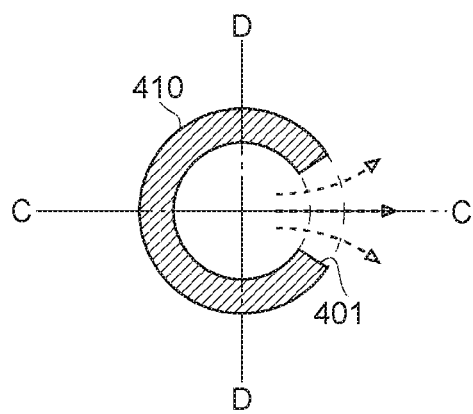
FIG. 22 is a sectional view schematically illustrating the configuration of the head unit shown in FIG. 21, taken along a plane perpendicular to the axis of the head unit.

FIG. 21 shows a first example of the head unit. FIG. 22 is a sectional view schematically illustrating the configuration of the head unit shown in FIG. 21, taken along a plane perpendicular to the axis of the head unit. As shown in FIGS. 21 and 22, a head unit 410 may be cylindrical in shape with one end being opened. The open end of the head unit 401 may be connected to the cylinder 421 (see FIGS. 17 through 20). The outlet 401 may be formed in a side surface of the head unit 410. The head unit 401 may, for example, be formed of $SiO_2$.

8.2 Second Example

Figure 23:
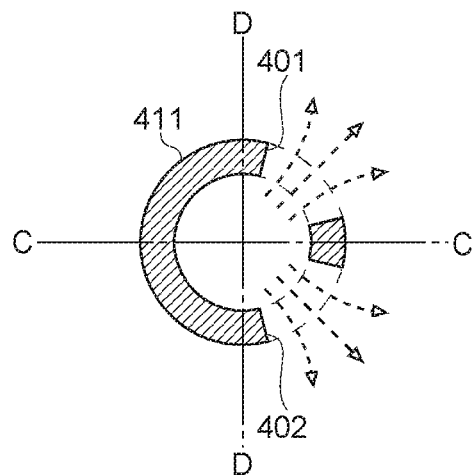
FIG. 23 schematically illustrates a second example of the configuration of a head unit.

FIG. 23 is a sectional view schematically illustrating the configuration of a second example of the head unit, taken along a plane perpendicular to the axis of the head unit. In this example, a head unit 411 may be similar in configuration to the head unit 410 shown in FIGS. 21 and 22, but two outlets 401 and 402 may be formed in a side surface of the head unit 411 along a semiarcular portion thereof.

8.3 Third Example

Figure 24:
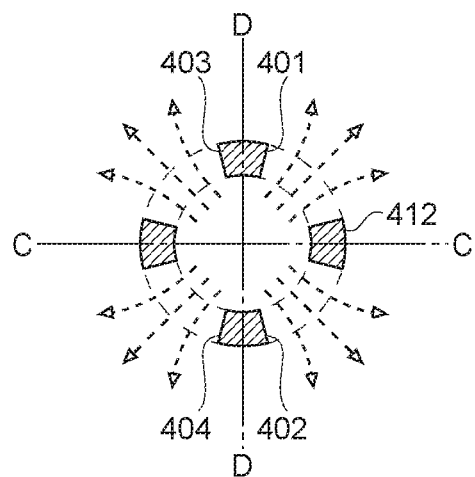
FIG. 24 schematically illustrates a third example of the configuration of a head unit.

FIG. 24 is a sectional view schematically illustrating the configuration of a third example of the head unit, taken along a plane perpendicular to the axis of the head unit. In this example, a head unit 412 may be similar in configuration to the head units 410 and 411 (see FIGS. 21 through 23), but multiple outlets 401 through 404 may be formed in a side surface of the head unit 412. A distance between any adjacent two of the outlets 401 through 404 may be the same. This configuration may allow the hydrogen radicals FH to flow uniformly across the entire mirror surface 123a (see FIG. 5).

8.4 Effects

The number or the position of outlets to be formed in a head unit is not limited to those shown in the above-described examples, and may be selected accordingly. Further, positioning of a head unit with respect to a mirror surface of an EUV collector mirror may be determined appropriately.

For example, in the case of the head unit 410 of the first example described above, the outlet 401 may be oriented toward a portion of the mirror surface 123a where a relatively large amount of the Sn debris is deposited. With this positioning, the reduction in the reflectance at a particular portion of the EUV collector mirror may be suppressed. The outlet 401 may, for example, be oriented toward the through-hole 24 through which the pulse laser beam 33 may travel. Sn debris is known to diffuse from the droplet 27 toward the side at which the pulse laser beam 33 strikes the droplet 27. Accordingly, by orienting the outlet 401 toward the through-hole 24, the reduction in the reflectance at a portion of the EUV collector mirror where a larger amount of the Sn debris may be deposited may be suppressed.

Alternatively, the outlet 401 may be oriented toward a region aside from the obscuration region 253. With this positioning, the reduction in the reflectance at a portion of the EUV collector mirror where the EUV light to be used for the exposure processing is reflected may be suppressed.

In the third embodiment shown in FIGS. 13 and 14, the outlet 401 may alternately be oriented toward the outer periphery of the mirror surface 123a to which the ionized debris flowing along the magnetic field B may reach. In the third embodiment, even if the notches 524 are formed in the EUV collector mirror 523, an edge of the notch 524 may be sputtered slightly by the ionized debris. In such a case, the Sn debris deactivated after sputtering may adhere around the sputtered portion. Accordingly, orienting the outlet 401 toward this portion may help to suppress reduction in the reflectance around the aforementioned portion. For example, the outlet 401 may be oriented toward the edge of the notch 524.

9. Installation of H Radical Supplier

A configuration for removably installing a radical supplier in the above-described embodiments will now be described with reference to the drawings. In the description to follow, the chamber apparatus 2B shown in FIG. 5 will be used as an example, but this disclosure is not limited thereto.

Figure 25:
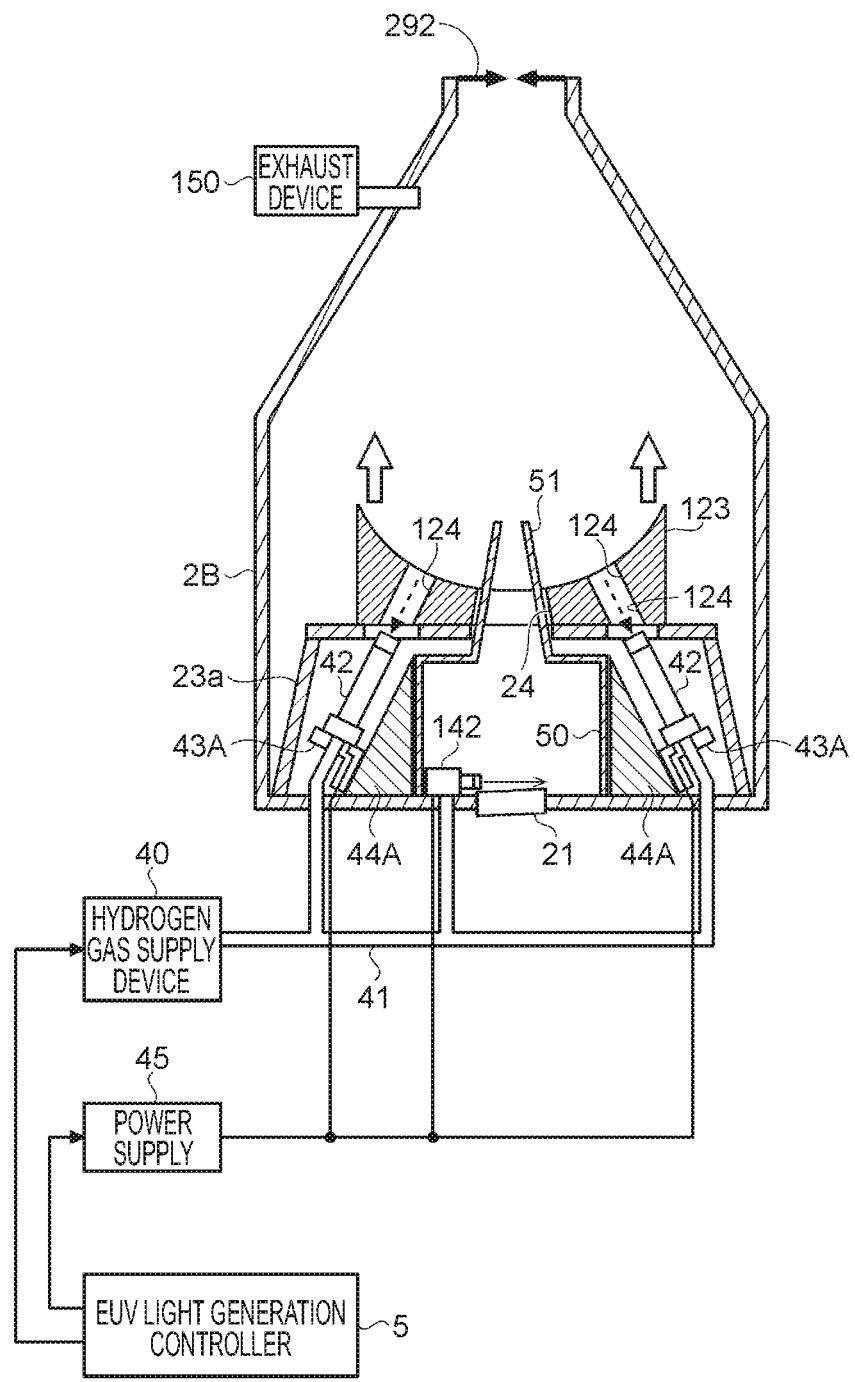
FIG. 25 schematically illustrates an example of a configuration of a chamber apparatus configured to allow a radical supplier to be moved.

As shown in FIG. 25, the through-hole 124 may be formed in the direction inclined with respect to the direction in which the through-hole 24 is formed. In that case, when the EUV collector mirror 123 is removed from the mirror mount 23a in the direction shown by the white arrows in a state where the radical supplier 42 is placed in the through-hole 124, the radical supplier 42 may interfere with the EUV collector mirror 123. Accordingly, a configuration to allow the radical supplier 42 to be easily removed from the through-hole 124 may be provided.

In the example shown in FIG. 25, an outer surface of a support tilt stage 44A may be tilted in the direction into which the through-hole 124 is formed in the EUV collector mirror 123 mounted on the mirror mount 23*a*. Further, a slide stage 43A may be configured to be movable along the outer surface of the support tilt stage 44A. When the EUV collector mirror 123 is to be removed from the mirror mount 23*a*, the slide stage 43A may be moved along the outer surface of the support tilt stage 44A to retract the radical supplier 42 from the through-hole 124 formed in the EUV collector mirror 123. Accordingly, the EUV collector mirror 123 may be removed easily from the mirror mount 23*a*. Here, the slide stage 43A may be configured to be operable from the outside of the chamber apparatus 2B by a moving mechanism (not shown), or may be configured to be operated manually.

The above-described embodiments and the modifications thereof are merely examples for implementing this disclosure, and this disclosure is not limited thereto. Making various modifications according to the specifications or the like is within the scope of this disclosure, and other various embodiments are possible within the scope of this disclosure. For example, the modifications illustrated for particular ones of the embodiments can be applied to other embodiments as well (including the other embodiments described herein).

The terms used in this specification and the appended claims should be interpreted as "non-limiting." For example, the terms "include" and "be included" should be interpreted as "including the stated elements but not limited to the stated elements." The term "have" should be interpreted as "having the stated elements but not limited to the stated elements." Further, the modifier "one (a/an)" should be interpreted as at least one or "one or more."

What is claimed is:

1. A chamber apparatus used with an external apparatus having an obscuration region, the chamber apparatus comprising: a chamber in which EUV light is generated;
   a collector mirror configured to collect the EUV light generated inside the chamber;
   a first through-hole formed in a region aside from the center of the collector mirror, the first through-hole being located in a region substantially corresponding to the obscuration region;
   a second through-hole formed in the collector mirror, through which an externally-applied laser beam travels;
   an etching gas supply unit provided in the first through-hole and configured to supply an etching gas into the chamber, the etching gas supply unit including an outlet through which the etching gas is discharged; and
   a magnetic field generator configured to generate a magnetic field inside the chamber,
   wherein the outlet is oriented only toward a part of a periphery of the collector mirror located in a region near the magnetic field generator corresponding to the obscuration region.

2. The chamber apparatus according to claim 1, wherein the outlet is oriented in a direction substantially parallel to a tangent to a mirror surface of the collector mirror.

3. The chamber apparatus according to claim 1, wherein the outlet is oriented in a direction inclined with respect to a tangent to a mirror surface of the collector mirror.

4. The chamber apparatus according to claim 1, wherein the etching gas supply unit includes:
   a generation unit configured to generate the etching gas; and
   a discharge unit including the outlet through which the generated etching gas is discharged.

5. The chamber apparatus according to claim 4, wherein:
   the etching gas supply unit is connected to a power supply and to a hydrogen gas supply device configured to supply a hydrogen gas to the generation unit,
   the generation unit is a filament, and
   the etching gas includes a hydrogen radical formed from the hydrogen gas excited by heating the filament with an electric power supplied from the power supply.

6. The chamber apparatus according to claim 5, further comprising a target supply unit configured to supply a target material into the chamber.

7. The chamber apparatus according to claim 6, wherein the target material is tin.

8. The chamber apparatus according to claim 1, further comprising:
   a slide stage configured to hold the etching gas supply unit; and
   a support unit configured to support the slide stage to be slidable therealong,
   wherein the slide stage is configured to be slidable along the support unit in a direction parallel to a direction into which the first through-hole is formed in the collector mirror.

9. An extreme ultraviolet light generation system, comprising:
   the chamber apparatus of claim 1;
   a laser apparatus configured to output a laser beam; and
   an optical system configured to guide the laser beam from the laser apparatus to the chamber apparatus.

* * * * *